(12) United States Patent
Goodman et al.

(10) Patent No.: US 8,538,477 B2
(45) Date of Patent: Sep. 17, 2013

(54) DOCKING STATION FOR MOBILE DEVICE FOR DISPLAYING CONTACT INFORMATION

(75) Inventors: Lee N. Goodman, Tyngsboro, MA (US); Elliot G. Eichen, Arlington, MA (US); Rafael Andres Gaviria Velez, Medford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 134 days.

(21) Appl. No.: 13/162,653

(22) Filed: Jun. 17, 2011

(65) Prior Publication Data

US 2012/0321057 A1 Dec. 20, 2012

(51) Int. Cl.
*H04M 1/00* (2006.01)

(52) U.S. Cl.
USPC .................................. 455/556.1; 455/426.1

(58) Field of Classification Search
USPC ............................. 455/41.2, 41.3, 557, 556.1
See application file for complete search history.

(56) References Cited

U.S. PATENT DOCUMENTS

| | | | |
|---|---|---|---|
| 7,110,789 B1* | 9/2006 | Curtiss et al. | 455/556.1 |
| 7,697,963 B1* | 4/2010 | Pomery | 455/572 |
| 2008/0004038 A1* | 1/2008 | Dunko | 455/456.1 |
| 2008/0108386 A1* | 5/2008 | Hard | 455/557 |
| 2011/0026368 A1* | 2/2011 | Relyea | 368/10 |
| 2011/0053643 A1* | 3/2011 | Shmunis | 455/556.1 |
| 2012/0046074 A1* | 2/2012 | Gittleman et al. | 455/557 |
| 2012/0054401 A1* | 3/2012 | Cheng | 710/304 |
| 2012/0155332 A1* | 6/2012 | Chang et al. | 370/259 |
| 2012/0225622 A1* | 9/2012 | Kudrna et al. | 455/41.2 |
| 2012/0280784 A1* | 11/2012 | Gaviria Velez et al. | 340/5.7 |
| 2012/0324135 A1* | 12/2012 | Goodman et al. | 710/304 |

* cited by examiner

*Primary Examiner* — Creighton Smith

(57) ABSTRACT

Embodiments disclosed herein include a docking station for a mobile device, for example. The docking station may include a docking port configured to physically receive a mobile device and a receiver to receive a list of contacts from the mobile device. The docking station may also include a display to show the list of contacts, wherein each contact is associated with a sensor for receiving an input from a user for selecting the corresponding contact. The docking station may further include a transmitter to send a selection of one of the contacts in the list of contacts, as input by the user via the sensor corresponding to the selected contact, to the mobile device to initiate a telephone call with a device associated with the selected contact.

20 Claims, 9 Drawing Sheets

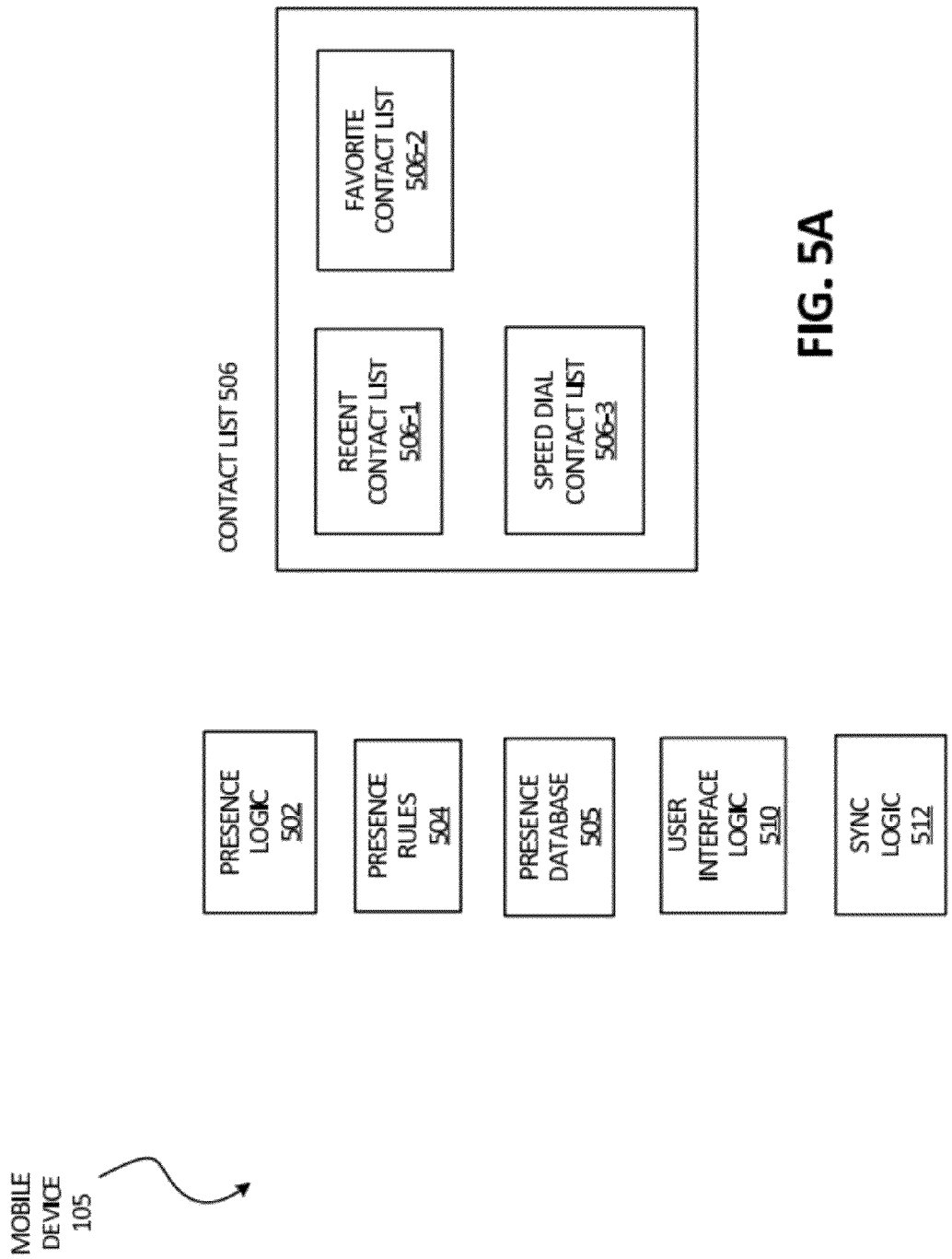

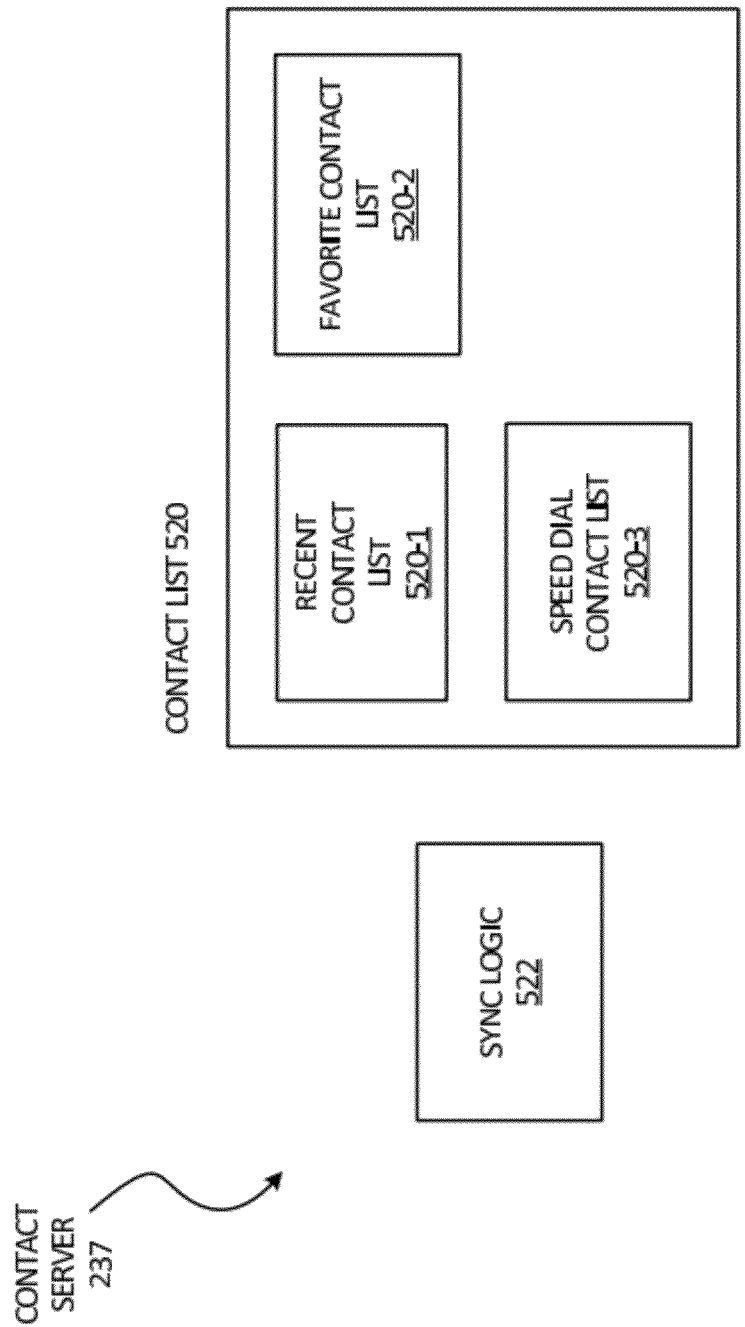

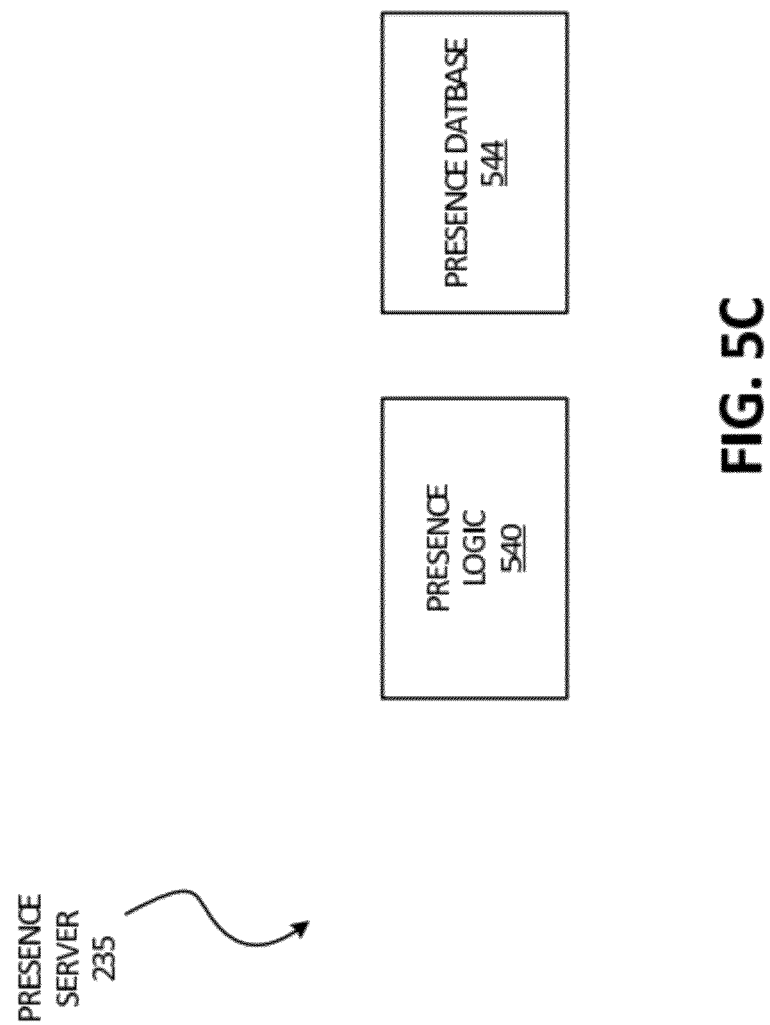

DOCKING STATION FOR MOBILE DEVICE FOR DISPLAYING CONTACT INFORMATION

BACKGROUND

Mobile devices (e.g., mobile phones) are becoming increasingly powerful AND popular. More and more phones sold to consumers are considered "smart phones," "app phones," or "super-smart phones." These mobile devices can run numerous applications while connecting to global data networks.

BRIEF DESCRIPTION OF THE DRAWINGS

FIG. 5A is a block diagram of exemplary functional and logical components of the mobile device of FIGS. 1A and 1B;

FIG. 5B is a block diagram of exemplary functional and logical components of the contact server of the network of FIG. 2;

FIG. 5C is a block diagram of exemplary functional and logical components of the presence server of the network of FIG. 2.

DETAILED DESCRIPTION OF THE PREFERRED EMBODIMENTS

The following detailed description refers to the accompanying drawings. The same reference numbers in different drawings may identify the same or similar elements. The following detailed description does not limit the invention, as claimed.

Mobile devices (e.g., mobile phones), although "smart" with the ability to run applications, do not necessarily have the most desirable form factors for users. For example, some users may find a touch screen awkward to use for dialing telephone numbers. Some users may not find a small mobile device suitable for long conversations and would prefer the feel of a full handset normally associated with traditional telephones. In embodiments described herein, a docking station for a mobile phone may complement the form factor of the mobile phone. In one embodiment, the docking station may include a docking port configured to physically receive the mobile device. The docking station may receive a list of contacts from the mobile device and display the list of contacts on a display. In one embodiment, the docking station may also display presence information associated with the contacts. Each contact may be associated with a button or a sensor for receiving input from a user. The docking station may send a selection by the user of one of the contacts to the mobile device for initiating a telephone call.

Figure 1A:
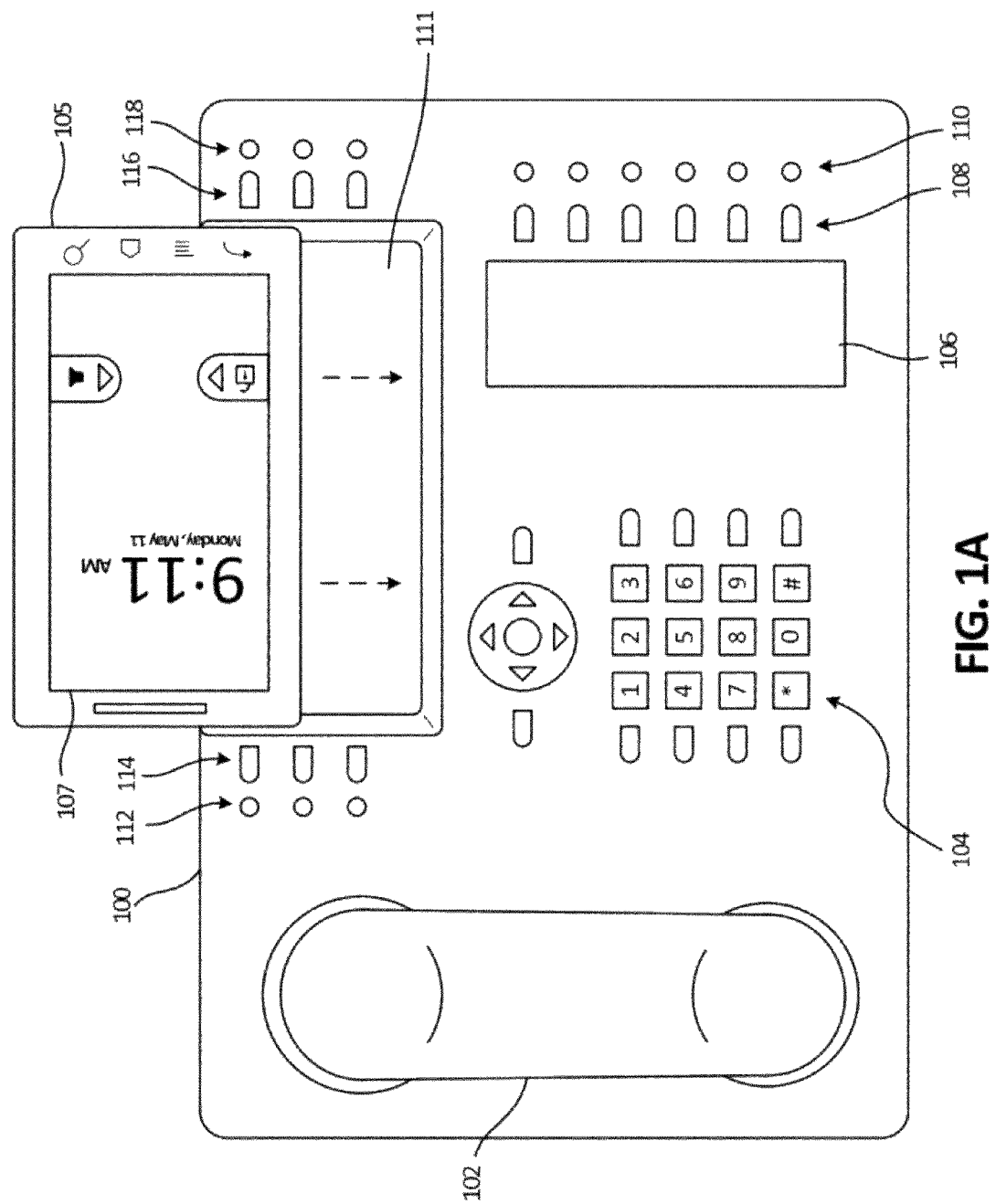
FIG. 1A is a diagram of an exemplary mobile device being docked in an exemplary docking station.
Figure 1B:
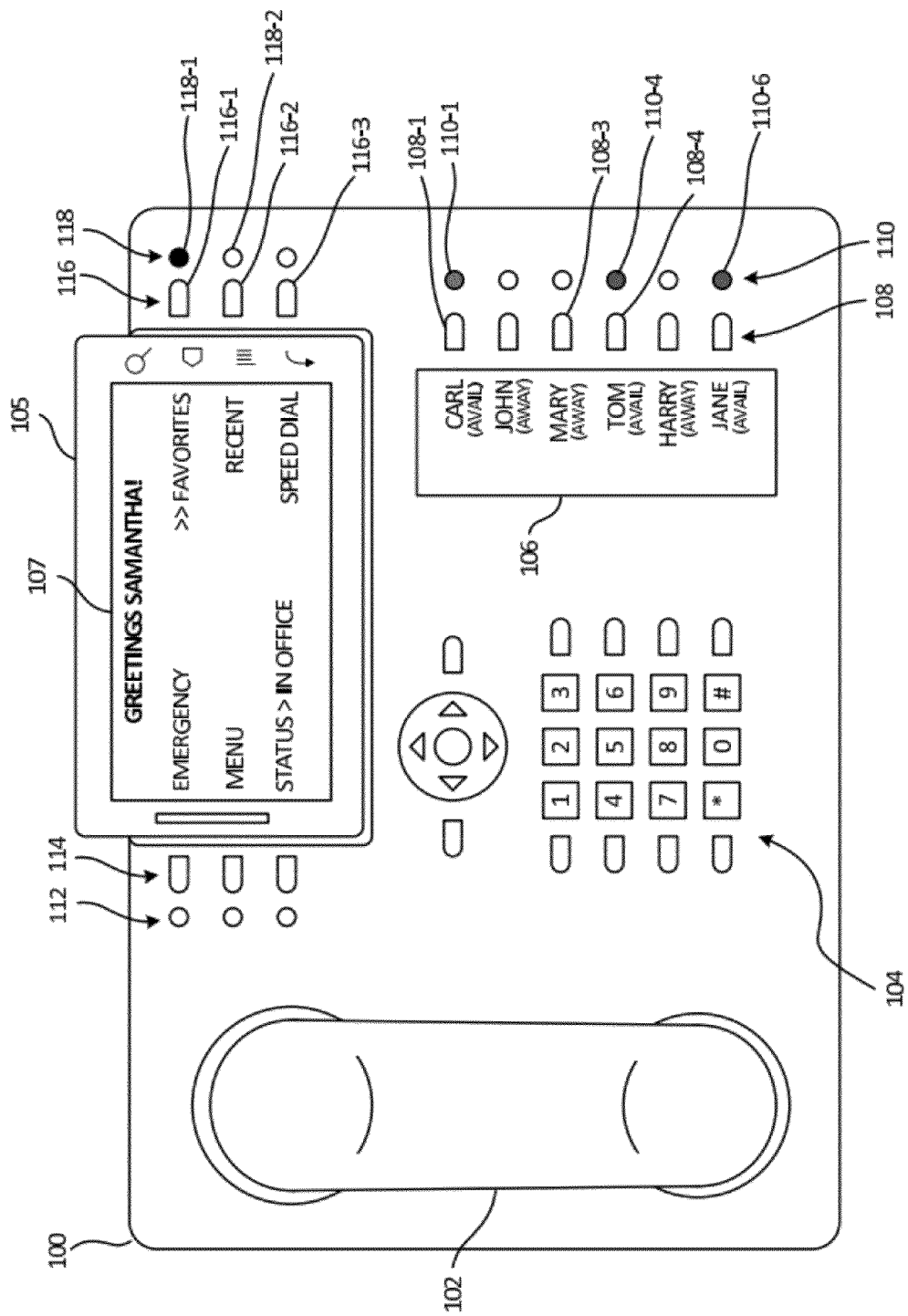
FIG. 1B is a diagram of the exemplary mobile device of FIG. 1A docked with the docking station.

FIGS. 1A and 1B show an exemplary docking station 100 and an exemplary mobile device 105. Mobile device 105 may include, for example, a cellular telephone (e.g., a smart phone), a hand-held tablet computer, or a larger tablet computer. FIG. 1A shows mobile device 105 being moved (in the direction of the arrows with dashed lines) into docking station 100. FIG. 1B shows mobile device 105 fully inserted into docking station 100. In one embodiment, mobile device 105 may control the operation of docking station 100 while docked. Further, mobile device 105 may receive input from docking station 100 and display information on docking station 100. Mobile device 105 may also use a network connection provided by docking station 100 for placing and receiving calls and transmitting and receiving data.

As shown in FIG. 1A, docking station 100 may include a handset 102, a keypad 104, a display 106, and a docking port 111. Handset 102 may include a microphone and a speaker (not shown) for a user to carry on a conversation with another party. Handset 102 may be tethered to docking station 100 by a cord (not shown) or wirelessly. Keypad 104 may allow the user to dial a telephone number (e.g., the user may pick up handset 102 and dial a telephone number using keypad 104).

Docking port 111 may receive mobile device 105 for docking (shown fully docked in FIG. 1B). The shape and size of docking port 111 may depend on the external configuration of mobile device 105. Docking port 111 may physically secure mobile device 105 into docking station 100, for example. In one embodiment, mobile device 105 may include a data port (e.g., a Universal Serial Bus (USB) port) to connect with a mating data port in docking station 100 for the exchange of information. Upon being docked with docking station 100, mobile device 105 may exchange data with docking station 100. The exchanged data may include information for populating information in display 106, such as recently called contacts, speed-dial contacts, favorite contacts, etc. In one embodiment, mobile device 105 may exchange data with docking station 100 before being docked, such as via Bluetooth or NFC (Near Field Communications) when mobile device 105 comes into proximity to docking station 100.

A column of programmable buttons 108 and a corresponding column of indicator lights 110 may be situated next to display 106. As shown in FIG. 1B, each of buttons 108 may be situated next to and be associated with information displayed on display 106. For example, button 108-1 is next to "CARL" displayed on display 106. In this example, pressing button 108-1 may initiate a call to Carl. Each of indicator lights 110 may also be situated next to and be associated with information displayed on display 106. For example, indicator light 110-1 (next to button 108-1 and "CARL" displayed in display 106) may displaying a color (e.g., green) to indicate information (e.g., that Carl is available to reach by telephone).

As shown in FIG. 1A, another column of programmable buttons 114 and a corresponding column of indicator lights 112 may be situated to one side of docking port 111. Similarly, another column of programmable buttons 116 and a corresponding column of indicator lights 118 may be situated to the other side of docking port 111. As shown in FIG. 1B, each of buttons 116 may be situated next to and be associated with information displayed on a display 107 of mobile device 105 once mobile device 105 is docked in docking station 100. For example, button 116-1 is next to "FAVORITES" displayed on display 107. In this example, pressing button 116-1 may allow the user to show a list of contacts on display 106 associated with a favorites list. Each of indicator lights 118 may be situated next to and be associated with information displayed on display 107. For example, indicator light 118-1 next to button 116-1 is not displaying color. In this example, indicator light 118-1 may indicate that the list of contacts associated with a favorites list is displayed on display 106.

Figure 2:
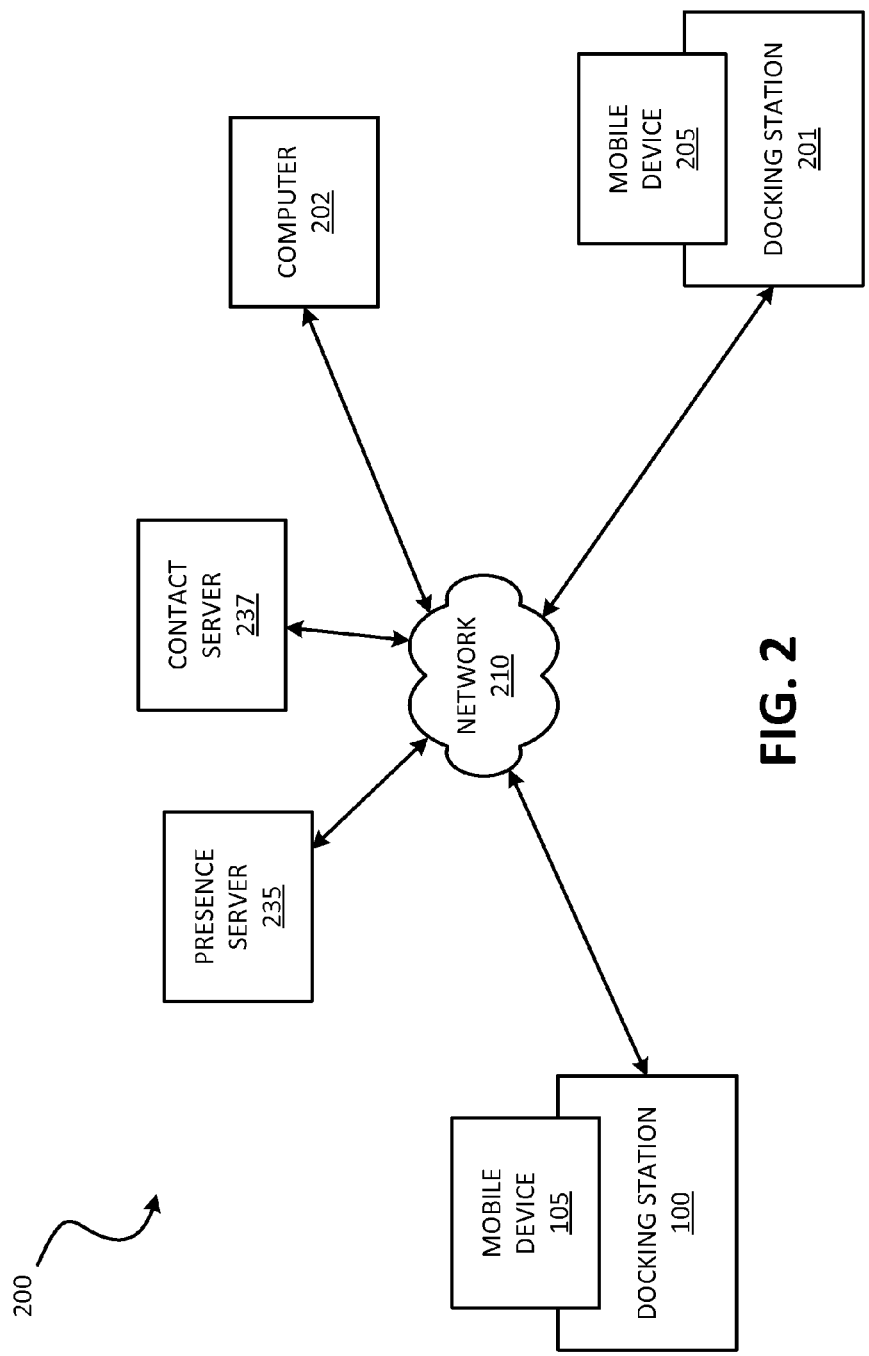
FIG. 2 is a block diagram of an exemplary network including docking stations and mobile devices.

FIG. 2 is a diagram that depicts mobile device 105 docked with docking station 100 in a network 200 in one embodiment. In addition to mobile device 105 and docking station 100, network 200 includes a presence server 235, a contact server 237, a mobile device 205, and a docking station 201. Consistent with the example of FIG. 1B, mobile device 105 in FIG. 2 is docked (e.g., physically inserted into docking port 111) with docking station 100. Likewise, mobile device 205 is docked with docking station 201 in network 200. Mobile device 205 and docking station 201 may be configured similarly to mobile device 105 and docking station 100 described above.

As shown in FIG. 2, docking station 100 may connect to network 210 for sending and/or receiving data to/from presence server 235 and contact server 237 and for placing and receiving telephone calls to other devices, such as mobile device 205 and/or docking station 201. Network 210 may include one or more networks that implement the Internet Protocol (IP), Ethernet protocol, or other protocols. Network 210 may include one or more networks of various types, including a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs). Network 210 may include a telecommunication network (e.g., a Public Switched Telephone Network (PSTN)), a local area network (LAN), a wide area network (WAN), a metropolitan area network (MAN), an intranet, the Internet, or a cable network (e.g., an optical cable network).

Contact server 237 may store contact information (e.g., address/telephone book information) for users of mobile devices, such as mobile device 105. Contact information may include the name, mobile telephone number, home telephone number, email addresses, etc. for each contact. For example, the user of mobile device 105 may have a user account with contact server 237. The user may store contact information (e.g., a list of information for friends, family, and business associates) in contact server 237. The contact information may be synchronized between mobile device 105 and contact server 237. That is, adding a contact in mobile device 105 may automatically add the contact to the user's account in contact server 237, and vice versa.

Presence server 235 may receive, store, and transmit information about the presence or status of users. For example, presence server 235 may allow a user to publish his status information (busy, available, etc.) so that other users may subscribe to the published presence information. To publish and subscribe to presence information, presence server 235 may implement the Extensible Messaging and Presence Protocol (XMPP). Alternatively, presence server 235 may also implement the Session Initiation Protocol (SIP) for Instant Messaging and Presence Leveraging Extensions (SIMPLE) for publishing and subscribing to presence information.

The devices in network 200 are exemplary. Network 200 may include more, fewer, or a different arrangement of devices than shown. Further, each device in network 200 may be able to communicate with each other device in network 200.

Figure 3:
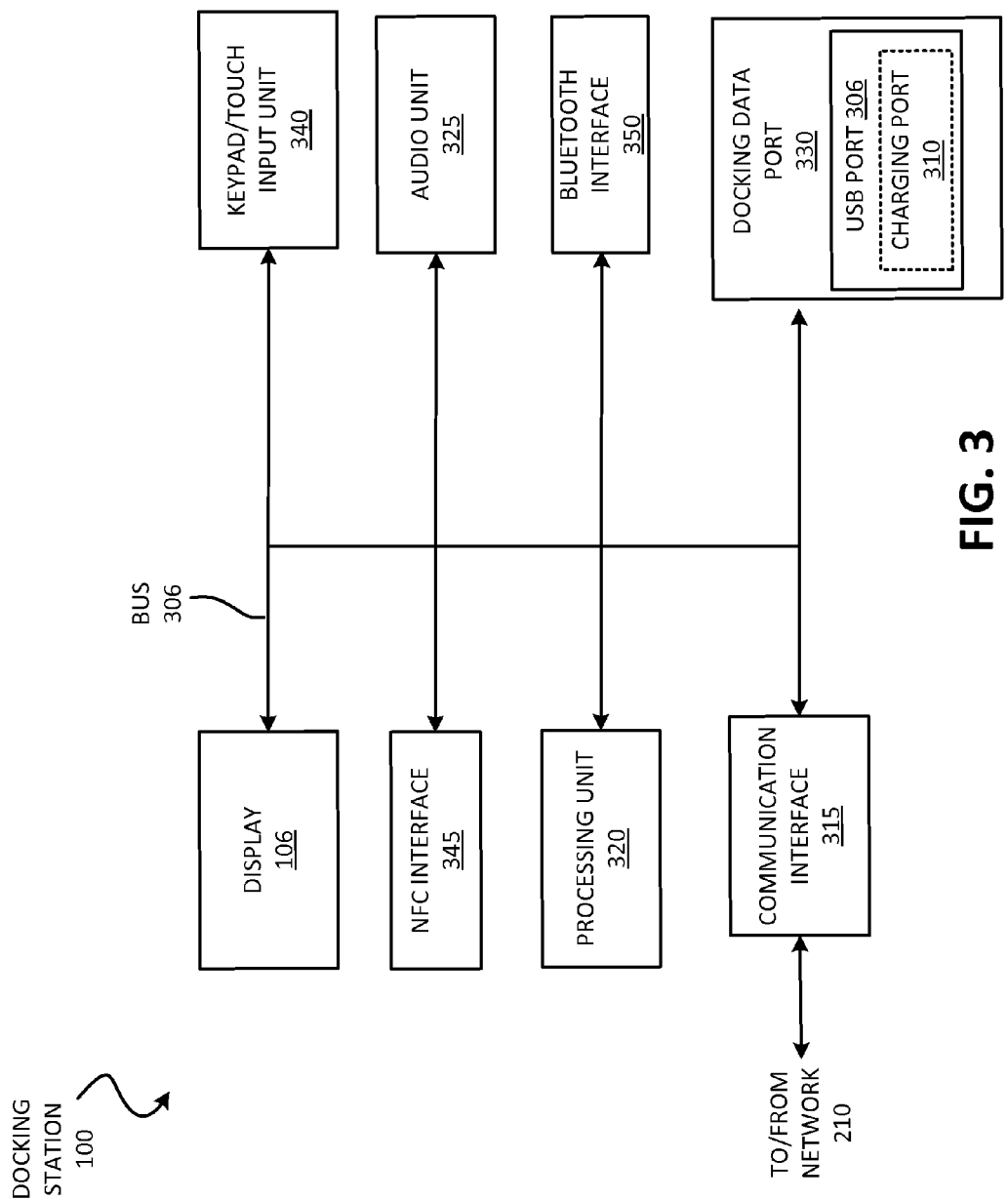
FIG. 3 is a block diagram of exemplary components of the docking station of FIGS. 1A and 1B.

FIG. 3 is a block diagram of exemplary components of docking station 100. Docking station 100 may include a bus 306, a docking data port 330, a communication interface 315, a processing unit 320, an audio unit 325, display 106, a keypad/button/touch input 340, a Near Field Communication (NFC) interface 345, and a Bluetooth interface 350. Bus 306 may include a path that permits communication among the components of docking station 100.

Docking data port 330 may include a data port that physically engages mobile device 105 for exchanging data. Port 330 may include a USB port 305, for example. Though a single USB port 305 is depicted in FIG. 3, docking station 100 may include multiple USB ports (not shown) and/or a USB hub. In another embodiment, data port 330 may include a wireless interface for exchanging data between mobile device 105 and docking station 100.

Charging port 310 may enable the battery of mobile device 105 to be charged while mobile device 105 is docked in the docking station 100. Charging port 310 may include an electrical connection for supplying electrical current to a battery of mobile device 105. In one embodiment, USB port 305 may include a charging port 310 (e.g., USB port 305 may act as both a data port and a charging port).

Communication interface 315 may include a transceiver for communicating with network 210. Communication interface 315 may include a network interface card (NIC), such as an Ethernet card. Processing unit 320 may include a processor, microprocessor, or processing logic that may interpret and execute instructions. The instructions may be stored in memory, such as, for example, a random access memory (RAM), a Read Only Memory (ROM), or another type of dynamic or static storage device that may store information and instructions for execution by processing unit 320.

Audio unit 325 may include a microphone (e.g., in handset 102 or the body of docking station 100) for receiving audio into docking station 100. In one embodiment, audio unit 325 passes the received audio to mobile device 105. Audio unit 325 may also include a speaker (e.g., in handset 102 or in the body of docking station 100) for playing audio data. In one embodiment, audio unit 325 may play audio received from mobile device 105.

Display 106 may include a display for displaying data, video, or other types of data. In one embodiment, display 106 may include a touch-screen display (e.g., capacitive or resistive) that registers touch input at different locations upon the screen. Keypad/button/touch input unit 340 may include an alphanumeric keypad for receiving indications from a keypad, buttons, and/or a touch-screen display associated with docking station 100.

NFC interface 345 may include a system that enables the short range (e.g., 10 cm) exchange of data with mobile device 105. When mobile device 105 is close to docking station 100 (e.g., mobile device 105 is inserted into docking port 111), NFC interface 345 may "read" phone identity information from a corresponding NFC interface located in mobile device 105. In addition to phone identity information, NFC interface 345 may also read the user identity information associated with mobile device 105 from the corresponding NFC interface located in mobile device 105. NFC interface 345 may, thus, be used to identify different phones that may be placed in proximity to docking station 100. Bluetooth interface 350 may include a system for connecting to and exchanging data with other Bluetooth enabled devices.

The configuration of components of docking station 100 illustrated in FIG. 3 is for illustration. Docking station 100 may include additional, fewer and/or different components than those depicted in FIG. 3. Docking station 100 may include a magnetic sensor that may detect the insertion of mobile device 105 into docking port 400 and may thereby initiate various functions at docking station 100 or at mobile device 105 (e.g., initiate execution of an application in mobile device 105 and/or docking station 100, etc.).

Figure 4:
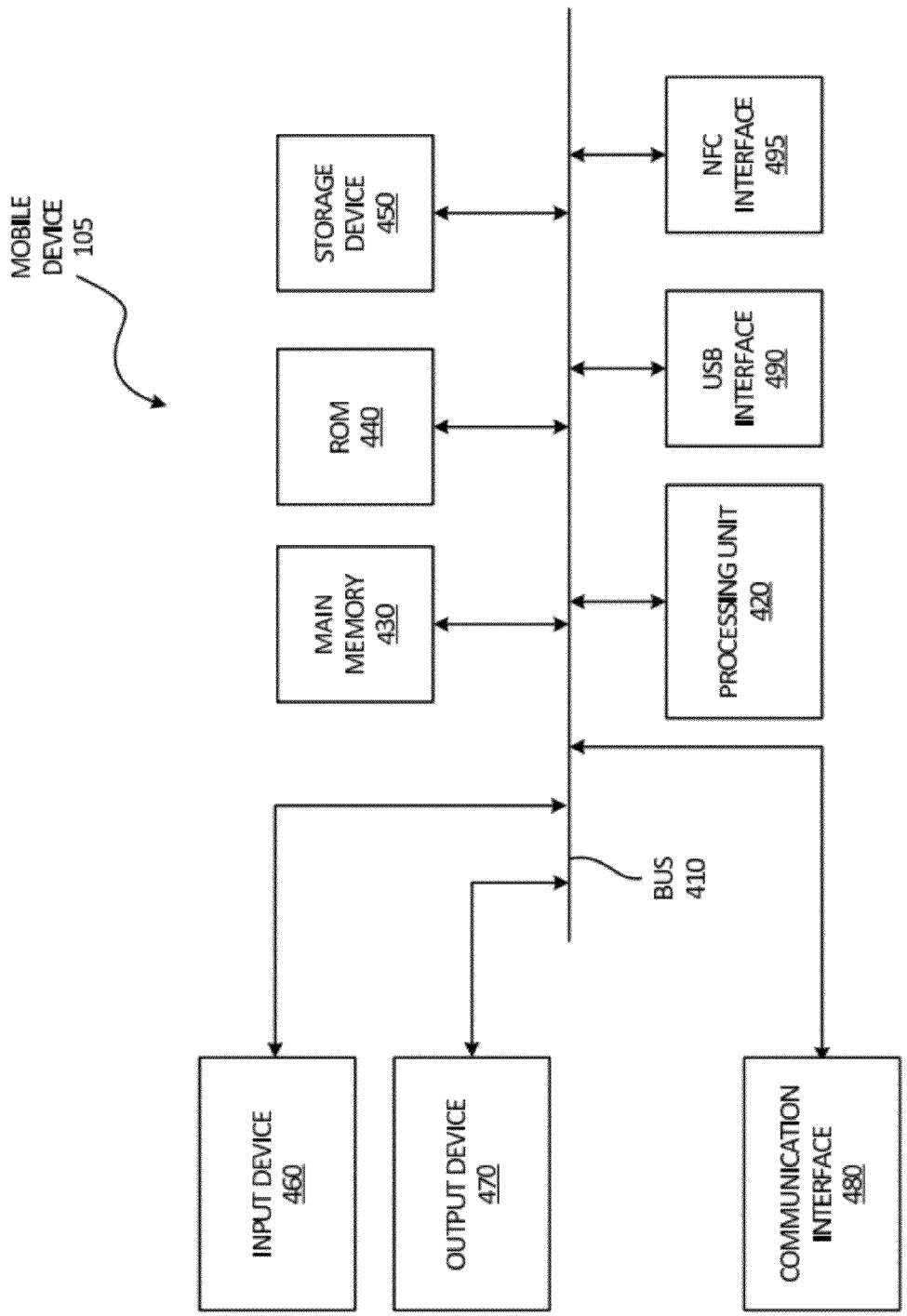
FIG. 4 is a block diagram of exemplary components of the mobile device of FIGS. 1A and 1B.

FIG. 4 is a block diagram of exemplary components of mobile device 105. Mobile device 105 may include a bus 410, a processing unit 420, a main memory 430, a ROM 440, a storage device 450, an input device 460, an output device 470, a communication interface 480, a USB interface 490, and a NFC interface 495. Bus 410 may include a path that permits communication among the components of mobile device 105.

Processing unit 420 may include a processor, microprocessor, or processing logic that may interpret and execute instructions. Main memory 430 may include a RAM or another type of dynamic storage device that may store information and instructions for execution by processing unit 420. ROM 440 may include a ROM device or another type of static storage device that may store information and instructions for use by processing unit 420. Storage device 450 may include a magnetic, optical, or solid-state medium for recording and storing information.

Input device 460 may include one or more mechanisms that permit an operator to input information to mobile device 105. Input device 460 may include, for example, a keypad, a keyboard, a touch-sensitive display, voice recognition, biometric mechanisms, etc. Output device 470 may include one or more mechanisms that output information to the operator, including a display, a speaker, etc.

Communication interface 480 may include a transceiver that enables mobile device 105 to communicate with other devices and/or systems. For example, communication interface 480 may include a radio-frequency transceiver for communicating via a PLMN of network 210. USB interface 490 may permit device 105 to physically and electrically connect with USB port 305 of docking station 100. NFC interface 495 may include a system that enables the exchange of data with NFC interface 344 in docking station 100. When mobile device 105 is placed in proximity to docking station 100 (e.g., mobile device 105 is inserted into docking port 111), NFC interface 495 may transmit phone identity information and/or phone user identity information that may be received by NFC interface 345 of docking station 100.

FIG. 5A is a block diagram of exemplary functional and logical components of mobile device 105 (e.g., data or functional components stored in main memory 430, ROM 440, and/or storage device 450). Mobile device 105 may include presence logic 502, presence rules 504, presence database 505, contact list 506, user-interface logic 510, and sync logic 512. Contact list 506 may include a recent contact list 506-1, a favorite contact list 506-2, and a speed-dial contact list 506-3.

Presence logic 502 may determine the presence information associated with the user of mobile device 105. For example, once docked into docking station 100, presence logic 502 may determine the user's presence information as "IN OFFICE" or "IN OFFICE 10C." When presence logic 502 detects that it is connected to the user's home wireless network, presence logic 502 may determine that the presence information is "AT HOME." Presence rules 504 may store the rules for determining presence information associated with the user of mobile device 105. Once presence information is determined, presence logic 502 may published the information to presence server 235.

Contact list 506 may include information related to contacts associated with the user of mobile device 105. For example, a contact may include a name, a nickname, a home telephone number, a mobile telephone number, a postal address, an email address, an instant messaging address, etc. Recent contact list 506-1 may include the contacts that the user of mobile device 105 recently contacted (e.g., recently called, emailed, texted, etc.). Favorite contact list 506-2 may store the contact information for contacts that the user of mobile device 105 most frequently contacts. Speed-dial list 506-2 may store the contact information for contacts that the user of mobile device 105 identifies as his or her favorites.

Sync logic 512 may synchronize information stored in contact list 506 with information stored in contact server 237. Sync logic 512 may transmit contact information (e.g., stored in contact list 506) to contact server 237 and/or may receive contact information from contact server 237 for storing in contact list 506.

Presence logic 502 may also subscribe to and receive presence information associated with users in contact list 506 (e.g., via presence server 235). Presence logic 502 may store the presence information in presence database 505. For example, a contact with the nickname "JOHN" may publish presence information "AWAY." Presence logic 502 may subscribe to this presence information for display to the user of mobile device 105 and/or docking station 100.

User-interface logic 510 (e.g., an application in mobile device 105) may launch when mobile device 105 is docked with docking station 100. In this instance, user-interface logic 510 may instruct docking station 100 to display information on display 106. User-interface logic 510 may also instruct indicator lights (e.g., indicator lights 110, 112, and/or 118) to show a color, for example. In one embodiment, different colors may indicate different presence information. User-interface logic 510 may also receive information from docking station 100, such as information indicating a button press by a user. User-interface logic 510 may also associate information received from docking station 100 (e.g., a button press) with an action (e.g., call the contact displayed adjacent the corresponding button). In one embodiment, user-interface logic 510 may run in mobile device 105 continuously and may recognize when mobile device 105 is docked with docking station 100.

The configuration of components of mobile device 105 illustrated in FIGS. 4 and 5A are for illustrative purposes. Other configurations may be implemented. Mobile device 105 may include additional, fewer and/or different components than those depicted in FIGS. 4 and 5A. Further, other devices in network 200 may include the components and perform the functions described above with respect to mobile device 105 in FIG. 5A. In one embodiment, for example, docking station 100 may also or alternatively include presence logic 502, presence rules 504, presence database 505, and/or user-interface logic 510. In this embodiment, presence logic 502 in docking station 100 may determine the presence information (for storage in presence database 505). When mobile device 105 is docked, presence logic 502 may apply rules in presence rules 504 to update the presence information stored in docking station 100 and presence server 235. Presence logic 502 may read identity information from mobile device 105 to identify the user of mobile device 105. User interface logic 510, stored in docking station 100, may instruct display 106, display 107, and/or indicator lights 110, 112, or 118 to display contact or presence information.

FIG. 5B is a block diagram of exemplary functional or logical components of contact server 237 (e.g., stored in a memory of contact server 237). Contact server 237 may include contact list 520 and sync logic 522. Contact list 520 may include a recent contact list 520-1, a favorite contact list 520-2, and a speed-dial contact list 520-3. The configuration of components of contacts server 237 illustrated in FIG. 5B is for illustrative purposes. Other configurations may be implemented. Mobile device 105 may include additional, fewer and/or different components than those depicted in FIG. 5B.

Contact list 520 may store substantially the same information as contact list 506, e.g., contact information associated with a user. Contact list 520, however, may store contact information for many different users of different mobile devices (e.g., mobile device 105 and mobile device 205).

Recent contact list 520-1 may store information substantially similar to recent contact list 506-1; favorite contact list 520-2 may store information substantially similar to favorite contact list 506-2; and speed-dial contact list 520-3 may store information substantially similar to speed-dial contact list 506-3. Sync logic 522 may synchronize information between contact server 237 and mobile devices, such as mobile device 105 or mobile device 205.

FIG. 5C is a block diagram of exemplary functional or logical components of presence server 235 (e.g., stored in memory of presence server 235). Presence server 235 may include presence logic 540 and presence database 544. The configuration of components of presence server 235 illustrated in FIG. 5C is for illustrative purposes. Presence server 235 may include additional, fewer and/or different components than those depicted in FIG. 5C.

Presence logic 540 may receive presence information published by users. Presence logic 540 may then make this information available to subscribers of the presence information. For example, a user identified by "John" may publish "AWAY" as his presence information. The user identified by "Samantha" may subscribe to John's presence information. Presence logic 540 may then transmit John's presence information (e.g., "AWAY") to Samantha. Presence logic 540 may store the presence information in presence database 544.

Figure 6:
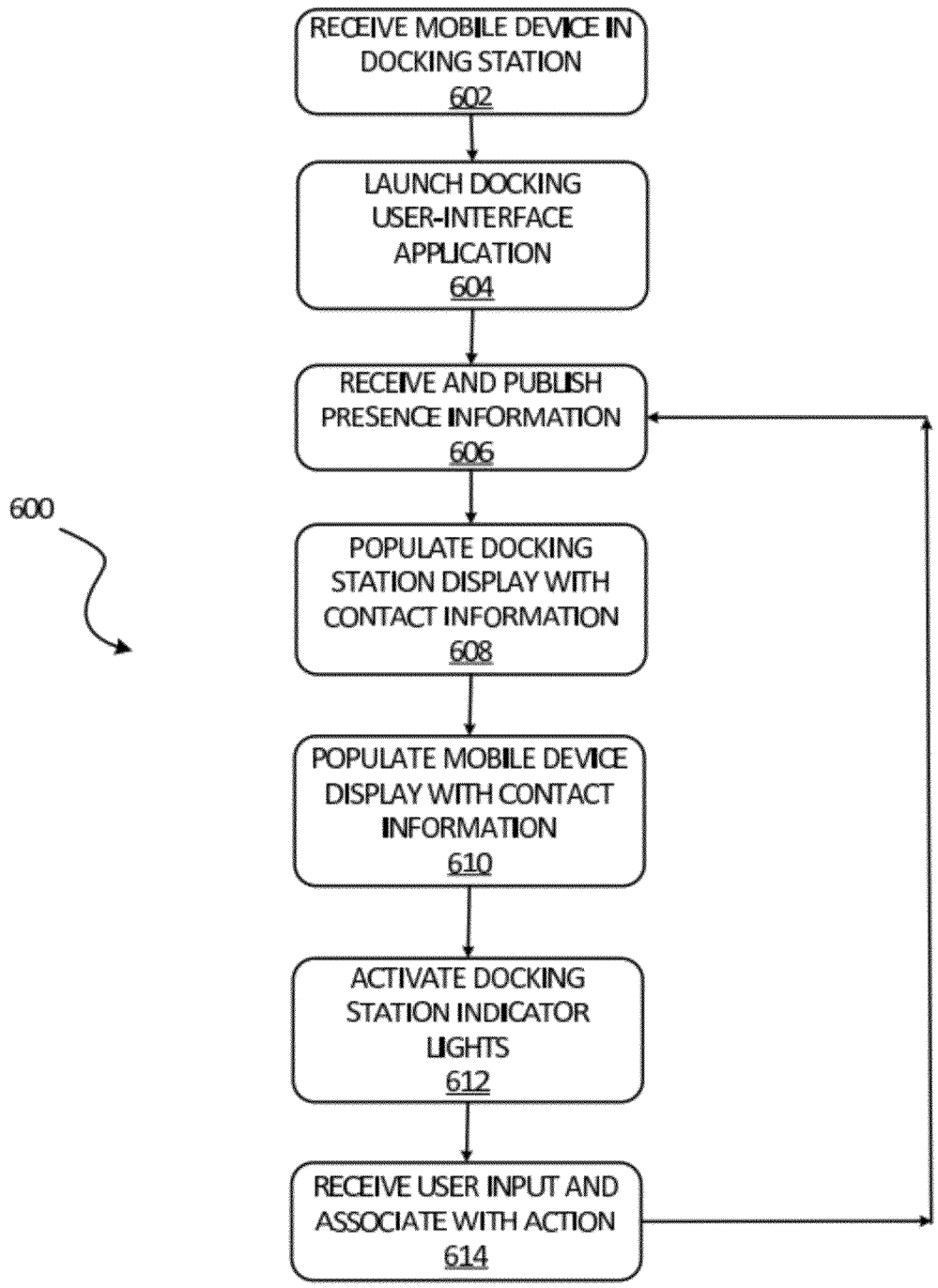
FIG. 6 is a flowchart of an exemplary process for displaying contact and presence information on the docking station of FIG. 1B.

As described above, docking station 100 may display contact information and presence information on display 106, for example. FIG. 6 is a flowchart of an exemplary process 600 for displaying contact information on docking station 100. Process 600 may begin when a user inserts mobile device 105 into docking station 100 (block 602). In the following example, the user is named "Samantha" and is associated with mobile device 105. As shown with dashed arrows in FIG. 1A, Samantha has moved mobile device 105 into docking port 111 of docking station 100 so that mobile device 105 is situated in docking station 100, as shown in FIG. 1B. In one embodiment, docking mobile device 105 with docking station 100 may also electrically connect USB port 305 (in mobile device 105) with USB interface 490 (in docking station 100).

Mobile device 105 may recognize that it is inserted into docking station 100 and may launch user-interface logic 510 (e.g., an application in mobile device 105) (block 604). In one embodiment, docking station 100 may detect the presence of mobile device 105 with near-field communications and may communicate with mobile device 105 via Bluetooth or NFC, for example. Mobile device 105 may communicate with docking station 100 via USB port 305 (in docking station 100) and USB interface 490 (in mobile device 105).

Mobile device 105 may receive and publish presence information to/from presence server 235 (block 606). In another embodiment, docking station 100 may also or alternatively receive and publish presence information to/from presence server 235 (block 606) (e.g., in the case where docking station 100 includes presence logic 502). Presence logic 502 may communicate with (e.g., register) presence server 235 and/or contacts server 237. In one embodiment, the docking of mobile device 105 with docking station 100 may change the presence information associated with the user of mobile device 105 (e.g., based on presence rules 504). For example, if mobile device 105 and docking station 100 are in Samantha's office, then presence logic 502 may publish "IN OFFICE" to presence server 235. As shown in FIG. 1B, user-interface logic 510 may also display "STATUS>IN OFFICE" on display 107 of mobile device 105.

As another example, if docking station 100 and mobile device 105 are in Samantha's home, then presence logic 502 may publish "AT HOME" to presence server 235. If docking station 100 and mobile device 105 are in a call center, then presence logic 502 may publish "IN CALL CENTER" to presence server 235. If docking station 100 and mobile device 105 are in conference room 10B, then presence logic 502 may publish "IN CONFERENCE ROOM 10B" to presence server 235.

Presence logic 502 may also receive presence information regarding contacts associated with Samantha's mobile device 105 (e.g., before or after docking mobile device 105 with docking station 100). For example, assume that Samantha subscribes to the presence information for the following contacts: Carl, John, Mary, Tom, Harry, and Jane. In this case, presence logic 502 may receive information indicating that user Carl is "AVAILABLE," user John is "AWAY," user Mary is "AWAY," user Tom is "AVAILABLE," user Harry is "AWAY," and user Jane is "AVAILABLE."

In one embodiment, mobile device 105 may also synchronize contact information stored in mobile device 105 with contact information stored in contacts server 237 (e.g., before or after docking mobile device 105 with docking station 100). For example, sync logic 512 in mobile device 105 may synchronize favorite contact list 506-2 with favorite contact list 520-2, recent contact list 506-1 with recent contact list 520-1, and speed-dial contact list 506-3 with speed dial contact list 520-3. In another embodiment, a list of contacts is stored in mobile device 105 and mobile device 105 may not synchronize or receive contact information from contacts server 237.

Mobile device 105 may populate display 106 of docking station 100 with contact information (block 608). For example, as shown in FIG. 1B, user-interface logic 510 may communicate with docking station 100 such that display 106 shows "CARL," "JOHN," "MARY," "TOM," "HARRY," and "JANE." As described below, pressing one of buttons 108 may initiate a telephone call to the contact associated with the button on display 106. In another embodiment, mobile device 105 may populate display 106 of docking station 100 with other information, such as information related to a menu selection (e.g., a menu selection to display a recent call list, a menu selection to change the presence information associated with mobile device 105, etc.).

Mobile device 105 may also populate display 107 of mobile device 105 with contact information (block 610). For example, as shown in FIG. 1B, user-interface logic 510 may display "EMERGENCY." As described below, pressing one of buttons 114 or 116 may initiate a telephone call to the contact associated with the contact displayed on display 107. In another embodiment, mobile device 105 may populate display 107 of mobile device 105 with other information, such as a menu selection. For example, as shown in FIG. 1B, display 107 shows "RECENT," "SPEED DIAL," "FAVORITES," "STATUS>IN OFFICE," etc. As described below, pressing one of buttons 114 or 116 may initiate an action associated with the corresponding information on display 107.

Mobile device 105 may activate docking station indicator lights (block 612). User-interface logic 510 may instruct docking station 100 to illuminate indicator lights. In one embodiment, indicator lights 110, 112, and 118 may each include one, two, three or more light-emitting diodes (LEDs) so that any color may be displayed. Different colors may indicate different presence information associated with the corresponding contact. For example, green may indicate that the corresponding contact is available for a telephone call, and red may indicate that the corresponding contact is not available for a telephone call. As shown in FIG. 1B, indicator light 110-1, indicator light 110-4, and indicator light 110-6 are illuminated to indicate that status of "AVAILABLE" to the user of docking station 100 for contacts Carl, Tom, and Jane. In another embodiment, as also shown in FIG. 1B, display 106 may display presence information associated with contacts. In one embodiment, indicator lights 110, 112, and/or 118 may illuminate with different lighting patterns (e.g., flashing at different rates, solid or not flashing, etc.). For example, a flashing green indicator light 110-1 may indicate that Carl has just become available for a telephone call (e.g., has been available for less than a threshold period of time); a flashing red indicator light 110-6 may indicate that Harry just became unavailable for a telephone call (e.g., has not been available for less than a threshold period of time); a solid green indicator light 110-1 may indicate that Carl has been available for a call for some time (e.g., greater than a threshold); and a solid red indicator light 110-6 may indicate that Harry has been unavailable for some time (e.g., greater than a threshold). The thresholds in this example may be 1, 2, 3, 4, 5, 10, 15, and/or 20 minutes for example.

Mobile device 105 may receive user input and associate the user input with an action (block 614). For example, Samantha may wish to call Tom. Samantha may press button 108-4 that is displayed next to Tom's name on display 106. In another embodiment, the user may touch Tom's name on display 106 if display 106 is a touch-sensitive display. Mobile device 105 may receive an indication from docking station 100 that a press of button 108-4 (or a touch of display 106) was received. Mobile device 105 may associate the button press (or the touch of display 106) with the contact information displayed on display 106. In the case of Samantha pressing button 108-4, mobile device 105 may initiate a call to Tom (e.g., by accessing the telephone number associated with Tom in contact list 506). In one embodiment, mobile device 105 may use the network connection provided by docking station 100 for initiating and carrying the call. In this embodiment, mobile device 105 may also employ handset 102 or a speaker and microphone in docking station 100, for example.

In the case of Samantha pressing button 108-3, mobile device 105 may initiate a call to Mary, even though the presence information displayed on display 106 indicates that Mary is AWAY. In the case that mobile device 105 receives an indication that Samantha pressed button 116-2, mobile device 105 may respond by instructing docking station 100 to display a list of recently called contacts on display 106 (e.g., from recent call list 506-1) and instructing indicator light 118-2 to illuminate (e.g., rather than indicator light 118-1). In the case that mobile device 105 receives an indication that Samantha pressed button 116-3, mobile device 105 may respond by instructing docking station 100 to display a list of contacts in speed-dial contact list 506-3 and to illuminate indicator light 118-3 (e.g., rather than indicator light 118-1).

In one embodiment, mobile device 105 may receive mapping information related to the display space and associated inputs of docking station 100. For example, docking station 100 may transmit information to mobile device 105 indicating that display 106 includes six fields (e.g., for listing six contacts) that are associated with six buttons (e.g., buttons 108-1 through 108-6) and six associated indicator lights (e.g., lights 110-1 through 110-6). The information may include the resolution or size of each field (e.g., the number of text rows and length of each row) and the type of information that each field may display (e.g., color graphics, black and white text, etc.). The mapping information may also include information about the location of buttons (e.g., buttons 114 and 116) along port 111, indicator lights along port 111 (e.g., indicator lights 112 and 118), and their location relative to port 111. When mobile device 105 receives this information, mobile device 105 may determine how to populate the information in display 106 and display 107. In one embodiment, this mapping information is stored in mobile device 105 for each model of docking stations and docking station 100 may indicate its model type to mobile device 105.

As shown above, docking station 100 may complement the form factor of mobile phone 105. In one embodiment, docking station 100 may include docking port 111 configured to physically receive mobile device 105. Docking station 100 may receive a list of contacts from mobile device 105 and may display the list of contacts on display 106. In one embodiment, each contact may be associated with buttons 108 for receiving input from the user. Docking station 100 may send a selection by the user of one of the contacts to mobile device 105 for initiating a telephone call to the selected contact. Docking station 100 may also display presence information associated with the contacts on display 106 or with indicator lights 110, for example.

As described above, in one embodiment, mobile device 105 is physically docked in port 111 of docking station 100. In another embodiment, mobile device 105 may be placed near docking station 100 and may communicate with docking station 100 wirelessly (e.g., wirelessly docking mobile device 105 with docking station 100 via Bluetooth, NFC, etc.). In this embodiment, mobile device 105 may still transmit information (e.g., contact information) to docking station 100 to populate display 106. Further, mobile device 105 may receive information from docking station 100, such as an indication of a selection of a contact by a user.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system comprising:
    a docking station including:
        a docking port configured to physically receive a mobile device;
        a receiver to receive a list of contacts from the mobile device;
        a display to show the list of contacts, wherein each contact is associated with a sensor for receiving an input from a user for selecting the corresponding contact; and
        a transmitter to send a selection of one of the contacts in the list of contacts, as received via the corresponding sensor from the user, to the mobile device to initiate a telephone call with a device associated with the selected contact.

2. The system of claim 1, wherein the receiver of the docking station is configured to receive presence information associated with each contact in the list of contacts, and
wherein the display of the docking station is configured to display the presence information associated with each contact.

3. The system of claim 1, wherein the docking station further comprises:
a plurality of indicator lights, wherein each contact in the list of contacts is associated with one of the indicator lights,
wherein the receiver in the docking station is configured to receive presence information associated with each contact in the list of contacts, and wherein the plurality of indicator lights indicate the presence information associated with each contact.

4. The system of claim 1, wherein each sensor for receiving input from the user includes a button proximate to a portion of the display showing the corresponding contact, and
wherein the button is configured to receive the input from the user for selecting the corresponding contact.

5. The system of claim 1, wherein each sensor for receiving input from the user includes a touch-sensitive portion of the display showing the corresponding contact,
wherein the touch-sensitive portion of the display is configured to receive the input from the user for selecting the corresponding contact.

6. The system of claim 1, wherein the transmitter is configured to transmit to the mobile device information indicative of a configuration of the display in relation to each corresponding sensor.

7. The system of claim 1, further comprising:
the mobile device, wherein the mobile device includes:
a transmitter to send the list of contacts from the mobile device to the docking station;
a receiver to receive the selection of the one of the contacts from the docking station; and
a processor for initiating the telephone call to the device associated with the contact.

8. A method comprising:
receiving, in a docking station, a list of contacts from a mobile device, wherein the mobile device is physically docked with a docking port of the docking station;
displaying the list of contacts on a display of the docking station, wherein each of the contacts is associated with a sensor for receiving an input from a user for selecting the corresponding contact;
receiving a selection, from the user, of one of the contacts in the list of contacts via the sensor corresponding to the selected contact; and
transmitting the selection to the mobile device to initiate a telephone call with a device associated with the selected contact.

9. The method of claim 8, further comprising:
receiving presence information associated with each contact in the list of contacts, and
displaying, on the display of the docking station, the presence information for each contact in the list of contacts.

10. The method of claim 8, wherein displaying the presence information includes turning on one or more of a plurality of indicator lights, wherein each of the contacts is associated with one of the indicator lights.

11. The method of claim 8, wherein each sensor for receiving input from the user includes a button proximate to a portion of the display showing the corresponding contact, and wherein receiving the selection includes receiving the selection from the user via the button.

12. The method of claim 8, wherein each sensor for receiving input from the user includes a touch-sensitive portion of the display showing the corresponding contact, wherein receiving the selection includes receiving the selection from the user via the touch-sensitive portion of the display.

13. The method of claim 8, further comprising transmitting to the mobile device information indicative of a configuration of the display in relation to each corresponding sensor.

14. The method of claim 8, further comprising:
transmitting the list of contacts from the mobile device to the docking station;
receiving the selection of the one of the contacts from the docking station; and
initiating the telephone call to the device associated with the contact.

15. A non-transitory computer-readable medium including instructions for execution by a processor, the instructions including:
one or more instructions for transmitting a list of contacts from a mobile device to a docking station for display to a user when the mobile device is docked with the docking station;
one or more instructions for receiving a selection of one of the contacts from the docking station; and
one or more instructions for initiating a telephone call to a device associated with the selected one of the contacts.

16. The non-transitory computer-readable medium of claim 15, further including one or more instructions for transmitting, to the docking station, presence information associated with each contact in the list of contacts for display to the user.

17. The non-transitory computer-readable medium of claim 15, further including one or more instructions for receiving, in the mobile device, information indicative of a configuration of the display in relation to corresponding sensors for receiving input from the user.

18. A mobile device comprising:
a transmitter to send a list of contacts from the mobile device to a docking station for display to a user, wherein the mobile device is docked with the docking station;
a receiver to receive a selection of one of the contacts from the docking station; and
a processor for initiating a telephone call to a device associated with the contact.

19. The mobile device of claim 18, wherein the transmitter is configured to transmit presence information associated with each contact in the list of contacts to the docking station for display to the user.

20. The mobile device of claim 18, wherein the receiver is configured to receive, from the docking station, information indicative of a configuration of the display in relation to corresponding sensors for receiving input from the user.

* * * * *